MAGNIFYING REFLECTION VIEWER FOR STEREOSCOPIC PICTURES

Filed Aug. 7, 1952 3 Sheets-Sheet 1

INVENTOR.
JACOB C. COPELAND
BY
Greene, Pineles & Durr
ATTORNEYS

INVENTOR.
JACOB C. COPELAND
BY
Greene, Pineles & Durr
ATTORNEYS

Feb. 26, 1957 J. C. COPELAND 2,782,681

MAGNIFYING REFLECTION VIEWER FOR STEREOSCOPIC PICTURES

Filed Aug. 7, 1952 3 Sheets-Sheet 3

INVENTOR.
JACOB C COPELAND

BY

ATTORNEYS

United States Patent Office 2,782,681

Patented Feb. 26, 1957

2,782,681

MAGNIFYING REFLECTION VIEWER FOR STEREOSCOPIC PICTURES

Jacob C. Copeland, Chicago, Ill.

Application August 7, 1952, Serial No. 303,055

3 Claims. (Cl. 88—29)

This invention relates to a magnifying viewer for stereoscopic pictures which operates entirely by reflection and without any base-in or base-out prisms or similar refracting elements.

It is among the objects of this invention to provide a binocular viewer of simple construction which is adapted for viewing stereoscopic pictures of small size (those on 35 mm. film for example).

Also among the objects of the invention is to provide a reflecting viewer for viewing small size stereoscopic pictures which viewer is free from refracting elements such as lenses and prisms and free from the aberrations produced by such devices.

Among the other objects of the invention is to provide a viewer for viewing juxtapositioned stereoscopic pictures or stereoscopic pictures which have not been cut from their original film strips and mounted in transposed position.

These objects and others ancillary thereto are obtained by constructing a viewer with two substantially identical spherical mirrors each of which may be approximately the size of a large spectacle lens and the axes of which are parallel. A half coated or semi-transparent mirror is located so as to extend from one edge of each of the spherical mirrors at an angle of 45 degrees. These spherical mirrors and half coated mirror are enclosed in a housing having a viewing aperture located in front of either the spherical mirrors or the said half coated mirrors or both sets of mirrors so that the eyes of the viewer looking through said aperture are aligned with the reflections coming from the respective axes of the spherical mirrors. The housing contains a slot or positioning means for holding the pictures or prints to be viewed either parallel to or at substantially right angles to the plane of the spherical mirrors. The spherical mirrors are preferably front surfaced mirrors. Suitable light diffusing means may be placed adjacent to and outside of the picture or print locating slot.

The device may be constructed so as to be illuminated by sun light, daylight or any outside source of light or it may contain its own illuminating means.

The height V of the spherical mirrors must have a certain value with respect to the focal length F of the mirror, i. e., V/F must be less than 0.94. The lower limit of V/F is not critical except in so far as the field is cut down when V becomes too small. As a general rule V/F should be between 0.8 and 0.94.

By adding two opaque mirrors to the device, (one for each eye) and rearranging the spherical and semitransparent mirrors it is possible to separate two juxtapositioned and untransposed images for binocular viewing. A camera for photographing two juxtapositioned and untransposed stereoscopic images on a film which may be approximately the size of a 35 mm. film so that the resultant pair of images may be viewed stereoscopically through this type of viewer is described.

The device of the invention may also be modified to view untransposed stereoscopic pictures normally separated as taken on commercial stereoscopic cameras without requiring that the said stereoscopic images be cut from the film and reversed as is the present practice.

The foregoing and other objects of the invention will best be understood from the following description of exemplifications of the same when read in connection with the accompanying drawing, in which.

Figure 1:
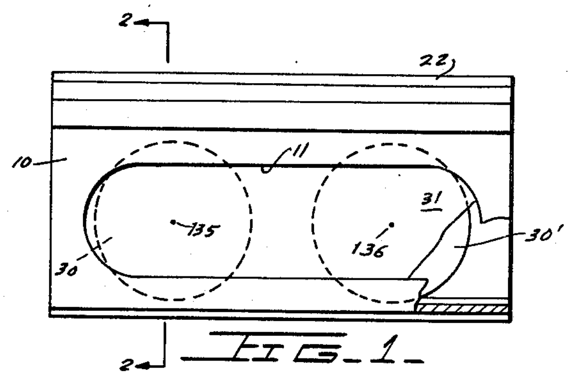
Fig. 1 is a front view of a device made according to the invention on a slightly reduced scale.
Figure 2:
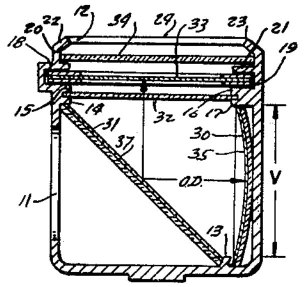
Fig. 2 is a cross sectional view taken along line 2—2 of Fig. 1.

The device of Figs. 1 and 2 comprises a housing 10 containing a viewing aperture 11 at one side thereof and an opening 12 at the top for admitting light. The housing 10 contains a number of projecting ribs adapted to position the various parts. The rib 13 at the bottom for example helps position the lower edge of both the spherical mirrors 30, 30' and the diagonal mirror 31. Longitudinal rib 14 positions the opposite edge of diagonal mirror 31. Associated with rib 14 is a similar rib 15 on the same side of housing 10 and two matching ribs 16 and 17 on the opposite side of housing 10. A cover glass 32 is adapted to fit into the slots between these pairs of ribs. The function of the cover glass is to keep dust out of the spherical mirror chamber.

Slots 18 and 19 are formed between ribs 15 and 16 respectively and ribs 20 and 21 for receiving the pictures 33 to be viewed. Finally a light diffusing means 34 such as opal glass is positioned between ribs 20 and 21 and ribs 22 and 23, respectively.

The housing 10 may be conveniently made by a continuous extrusion process. After extrusion it is only necessary to cut out the viewing aperture 11. It is preferable to close the ends as by end member 24 to prevent dust collecting on the elements. One of the ends 24 must include a slot (not shown) for admitting and removing the pictures 33.

In Fig. 1 the points 135 and 136 indicate the point where the axes of the spherical mirrors 30 and 30' would penetrate the aperture 11 (if these axes were visible). The distance between points 135 and 136 is approximately equal to an average pupillary distance of the eyes which in humans varies from 60–70 mm. As will be apparent from Fig. 1, the aperture 11 extends far enough to the sides of the housing to take in all of the side portions of mirrors 30 and 30'. In place of one continuous aperture 11 as shown two apertures, one for each eye, could be formed in the housing but this would only require extra and more precise operations for forming the apertures in the casing 10.

Fig. 2 illustrates the distances which are critical in the device. The plane of the picture 33 to be viewed is spaced slightly from the plane defined by the spaced top edges of the spherical mirror 30 and the diagonal mirror 31. The optical distance betwen the picture 33 and the spherical mirror 30 is shown by the angle line OD. In order for the device to operate properly the focal length F of the spherical mirror must be coordinated with the vertical dimension V of the mirror so that the ratio of V/F is less than 0.94 and is preferaby between 0.8 and 0.94. The vertical dimension V is measured from the edge which is adjacent the diagonal mirror at 13, to the top edge thereof which is just inside the plane of the picture 33. Mirrors 30 and 30' are shown as being circular in configuration but in fact they may be formed or cut to square or polygonal shape.

The mirrors 30 and 30' have a front surface reflecting coating 35, 36 thereon and the mirror 31 has a half coated reflecting surface 37 at the interior portion thereof. Instead of the semi-transparent glass mirror 31 a pellicular mirror may be employed.

Since the system of the invention does not depend on refracting means such as lenses and prisms and since front surfaced mirrors are employed, it is free of all chromatic aberration.

Figure 3:
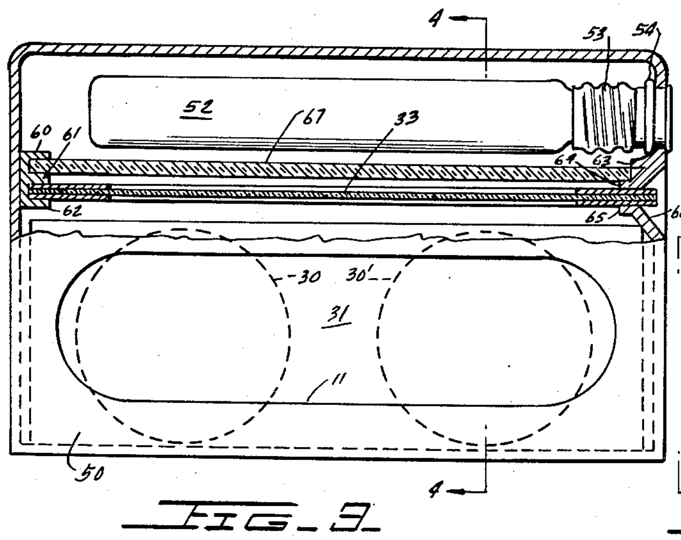
Fig. 3 is a full scale front cross-sectional view of a modified form of the device taken on line 3—3 of Fig. 4.
Figure 4:
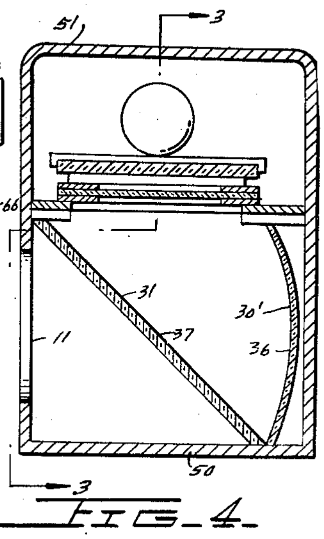
Fig. 4 is a cross-sectional view taken on line 4—4 of Fig. 3.
Figure 5:
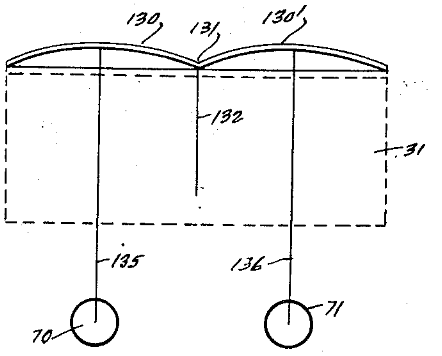
Fig. 5 is a top diagrammatic view of a modified form of device.
Figure 4A:
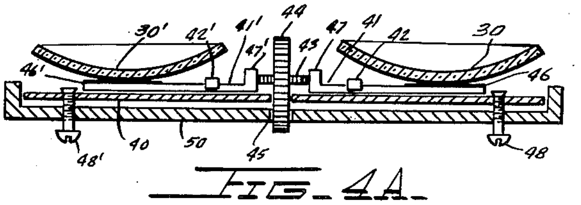
Fig. 4A is a top detail view of a modified spherical mirror mounting means.

Figs. 3 and 4 show a device with a built in illuminating system. The casing 50 of Figs. 3 and 4 is similar to casing 10 of Figs. 1 and 2. Like numbers refer to like parts in Figures 1–4. The casing 50 of Figs. 3 and 4 may be made of plastic material by injection molding for example. The casing 50 includes an upper housing 51 for holding the illuminating means which is shown as a long narrow electric lamp bulb 52 fitted into the socket 53 which in turn is attached to the base 54 and is adapted to receive a prong type of plug from a source of electric current. The base 54 may be molded into the upper part 51 of the casing 50. Internal projections 60, 61 and 62 are formed at one side of the casing to hold the opalescent glass plate 67 and form a channel for the picture mounting 33. A depression 66 is formed at the opposite side to enable one to get a grip on the end of the mounting 33 and interior projections 63, 64 and 65 matching projecttions 60, 61 and 62 respectively are formed opposite the depression 66. A slot 68 is formed between projections 64 and 65 to admit and remove the picture mounting. Slots may also be formed in the top surface of the casing so as to introduce the pictures from above projections 61 and 62, for example. Figs 3 and 4 are approximately the normal size of the device. If desired the spherical mirrors 30 and 30' may be made adjustable for varying pupillary distances by some such device as is shown in Fig. 4A. Here the mirrors 30 and 30' are cemented to arms 41 and 41' by cement 46 and 46'. Arms 41 and 41' are slidably held (but tightly) against the holder 40 by clamps 42, 42'. The adjacent ends of the arms 41, 41' have angled portions 47, 47' containing threaded opening into which the right and left hand threads of the ends of bolt 42 fits. The knurled rotating means 44 is secured to the center portion of bolt 42 and extends through the opening 45 in the back 40. Rotation of the means 44 therefore moves the mirrors 30, 30' toward or away from each other in equivalent increments. Holder 40 is adjustably held adjacent the back of housing 50 by means of screws 48 which may be adjusted to focus the device. Screws 48, 48' are combination rivets and screws the ends being riveted to the holder 40 and being rotatably held by the said holder 40. The intermediate portion between the heads and ends of screws 48 are threaded to move through the threaded openings in casing 50. Larger mirrors can be employed however as shown in Fig. 5. Here mirrors 130 and 130' are wide enough to meet at their interior edges 131. With most binocular devices a septum 132 separating the fields is considered essential. However, with the device of this invention the septum 132 can be omitted as it is in Figs. 1–4. Fig. 5 shows the location of the eyes 70 and 71. The relationship of the spherical mirrors 130, 130', the diagonal mirror 31, the axes 135, and 136 of the spherical mirrors, and the eyes 70, 71 of the viewer is shown in Fig. 5.

Figure 6:
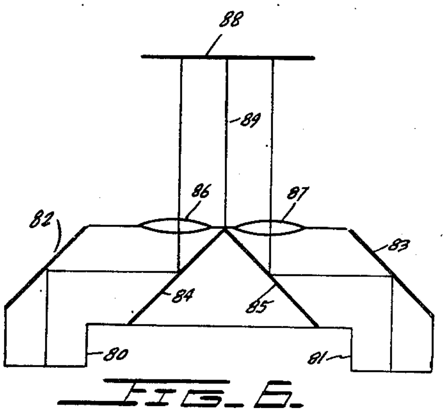
Fig. 6 is a diagrammatic view of the optical system of a camera for obtaining by photography two untransposed stereoscopic pictures in juxtapositioned relationship.

As a further development of this viewing system a photographing and viewing system has been found which eliminates a considerable amount of the cost and work required in the taking and mounting of stereoscopic photographs. The optical system of the photographing camera is shown diagrammatically in Fig. 6, it being understood that the parts shown in Fig. 6 could be housed in any suitable chamber which is light-proof and that it contains two objectives with shutters therebehind and two windows for admitting light to the mirror systems to be described.

The optical system of the camera comprises the openings 80, 81 which are in front of the objectives and shutters and serve to cut-out undesired radiations, a first mirror 82 or 83 directing the light or radiation toward a second mirror 84 or 85. Mirrors 82 and 83 are approximately at an angle of 45° to plane of the objectives of the camera and slope toward each other at an angle of about 90°. The mirrors 84 and 85 are also at an angle of 45° to the plane of the objectives and are substantially parallel to mirrors 82 and 83 respectively. Preferably all mirrors 82—85 are front surfaced mirrors. In back of the mirrors 84 and 85 are two photographic lenses with shutters 86 and 87 and these lenses focus the images on either side of a single strip of photographic film 88 the images being kept separate by the septum 89.

Figure 7:
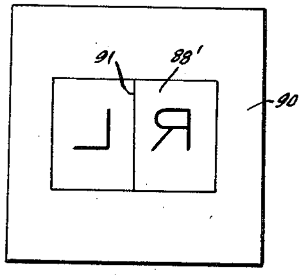
Fig. 7 is the back view of a mounted untransposed stereo pair of photographs taken by the camera of Fig. 6.

Since the images which are focused on film 88 are subjected to two reflections by mirrors 82 and 84, for example, the radiation as it leaves mirror 84 is substantially identical with the radiation entering opening 80. The lens 86 then produces and inverts the image so that even if one reinverts a transparent photograph in this camera, the final images are seen as illustrated in Fig. 7. When a camera employs a film of approximately 35 mm. size these are frequently mounted on a 2 x 2 paper frame 90. The film 88 requires no cutting along center line 91 and no reversing but can be mounted directly into frame 90 and often this is done in the commercial laboratory where the film is processed. Further investigation has shown that a camera of this type has previously been manufactured. Only six of the cameras were made and these employed 35 mm. film rolls. In order to view such stereoscopic pictures it was necessary to sever the two pictures and transpose them in reversed position.

Present methods in stereo-photography place a burden on the photographer in several ways. He must spend considerable time transposing and mounting his pictures after they are developed because the camera causes a lateral reversal of the image. Not only does transposing and mounting take time, but it requires meticulous care in cutting the film, pasting the film on the masks so that no rotation or vertical mal-alignment occurs, binding the mounted picture between glass and finally taping the edges. The masks, glass, and tape add to the total cost considerably. Besides an expensive mounting jig must be purchased to aid in alignment of images. Also, present stereo cameras using 35 mm. color film provide only 16 pairs of stereo pictures on a roll normally supplying enough film for 20 double-frame pictures like those taken with the standard single lens 35 mm. camera. This makes the cost of film per picture rather high.

My invention eliminates all of the above problems and actually adds many interesting and valuable features not possible or available with the present systems, cameras, or viewers.

Figure 8:
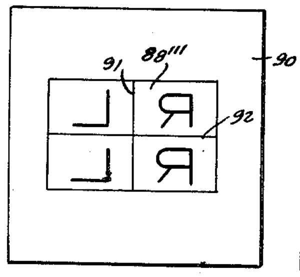
Fig. 8 is a back view of a modified form of stereo photographs taken by the camera of Fig. 6.

It is also possible to provide the camera with additional mechanical and optical means so that two or more pairs of stereoscopic pictures may be taken on one regular size film of 35 mm. for example. Fig. 8 shows the film 88'' with two dividing lines 91 and 92 separating the film into two pairs of right and left stereoscopic pictures.

Figure 9:
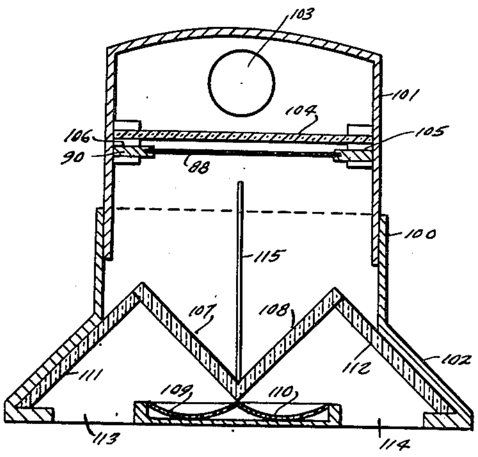
Fig. 9 is a cross sectional view of a viewer for stereoscopically viewing the photographs of Figs. 7 or 8.
Figure 10:
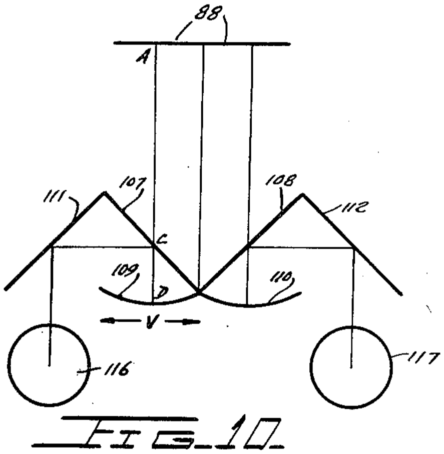
Fig. 10 is a detail view of the optical system of the viewer of Fig. 9.

The viewer shown in Figs. 9 and 10 is capable of transposing, magnifying and separating the images on the films 88' or 88''. This viewer comprises a housing 100 shown as formed in two telescoping parts, a rear part 101 and a front part 102. The rear part 101 contains a suitable lamp or illuminating means 103, and frosted glass 104 and a pair of slots 105 and 106 for positioning the mount 90 containing the film 88. Situated in front of the film 88 and in the front part of the viewer are the semi-transparent mirrors or pellicules 107 and 108 and adjacent the front surface of the housing 102 in front of mirrors 107 and 108 are the spherical mirrors 109 and 110. At right angles to each of the semi-transparent mirrors 107 and 108 is the opaque mirror 111 or 112 and in front of mirrors 111 and 112 are the viewing apertures 113 and 114 which are separated the average pupillary distance of the eyes. Septum 115 prevents any interference between the two images.

It will readily be seen from Fig. 10 that light transmitted through the left image on film 88 passes through the semi-transparent mirror 107 to the spherical mirror 109, back to the semi-transparent mirror 107 whence it is reflected to mirror 111 which in turn reflects the light toward the left eye 116. Similarly light is transmitted to the right eye 117. Since there are three or an odd number of reflections the laterally reversed image on film 88 is again reversed or righted. The spherical mirrors 109 and 110 provide a substantial magnification as these mirrors can be made of short focal length since they do not have to cover a wide field. All the limitations imposed above with respect to Figs. 1–5 on the size of the spherical mirrors 109 and 110 with respect to diagonal mirrors 107 and 108 are obviously observed although here the distance V is measured horizontally, i. e., in the direction of the slope of the diagonal mirrors.

It will be readily seen that this form of my viewer does two things. First, it automatically transposes the stereo-pair optically and second, it spaces the axes of the juxtaposed pair to a distance equal to the interpupillary distance of the average observer. Note that a third mirror which increases the number of reflections to three has been added to the basic system shown in Fig. 2 which is rearranged and turned on its side. An even number of reflections "rights" an image and does not reverse it laterally. An odd number of reflections reverses an image laterally and thus transposes the stereo-pair automatically. And also, this additional third mirror cooperates with the transparent diagonal mirror to displace the axis of each image laterally and in accordance with the observers pupillary distance.

Focusing of the film for different observers is accomplished by moving the rear telescopically mounted part 101 of the housing 100 with respect to the front part 102. The average pupillary distance makes the device suitable for most observers but adjustments for differences in pupillary distances may be made by providing for a very slight pivoting of mirrors 111 and 112 with respect to mirrors 107 and 108.

Figure 11:
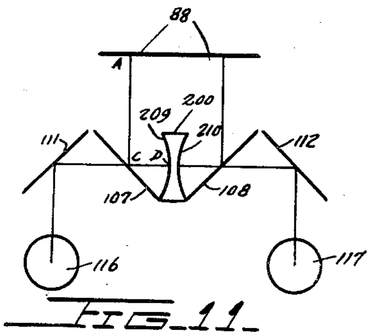
Fig. 11 is a view similar to Fig. 10 of the optic system of a modified form of the device shown in Fig. 9.

Fig. 11 shows a system very similar to Figs. 9 and 10 but with one advantage. In Fig. 11 the two spherical mirrors 109 and 110 of Figs. 9 and 10 are replaced by the double concave mirror 200 having the surface coated concave mirror surface 209 on one side and the surface coated concave mirror surface 210 on the other side. The mirror 200 can be made on a regular spectacle lens grinding and polishing machine and then surface coated with a reflecting metal on both sides so that a single optical element 200 replaces the two matched mirrors 109 and 110. This mirror also replaces the need for a septum.

Figs. 9–11 advantageously employ spherical mirrors 109, 110, 209 and 210 of relatively short focal length. In Fig. 10 for example the distance AD is the focal length of mirror 109 whereas in Fig. 11 the distance ACD equals the focal length of mirror 209. Of course mirrors of larger focal length can be employed by moving the plane of picture 88 further away from the said spherical mirrors. For obtaining high magnification with a small field, mirrors of short focal length are required and the systems of Figs. 9–11 are desirable. For larger fields of vision with lower magnification required, the systems shown in Figs. 12 and 13 are preferable.

Figure 12:
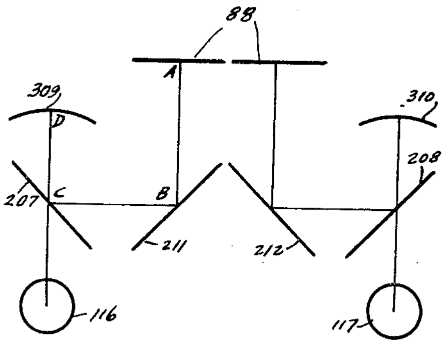
Fig. 12 is a view similar to Fig. 10 of the optic system of another modified form of the device shown in Fig. 9.
Figure 13:
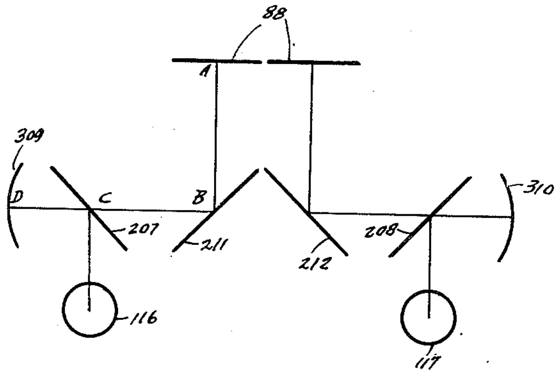
Fig. 13 is a view similar to Fig. 10 of the optic system of another modified form of the device shown in Fig. 9.

In Figs. 12 and 13 the spherical mirrors are at 309 and 310, the opaque mirrors at 211 and 212 and the semi-transparent mirrors at 207 and 208. In Fig. 12 the focal length of the spherical mirror 309 is the distance ABCD and in Fig. 13 the focal length of mirror 309 is ABD.

Each of the systems shown in Figs. 11–13 operates on three reflections of each image thereby reversing each image laterally as does the system of Fig. 10. The systems of Figs. 9–11 are well adapted for viewing stereoscopic images of a size of around 16 mm. whereas the systems of Figs. 12–13 are well adapted for viewing stereoscopic images each of which takes up approximately half of a 35 mm. film such as obtained by the previously described stereocamera.

Figure 14A:
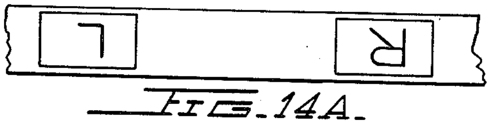
Fig. 14A is a view illustrating the complete reversal of images obtained by commercial stereoscopic cameras.
Figure 14B:
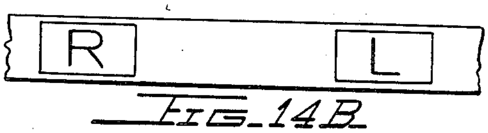
Fig. 14B is a view illustrating the reversal of the images obtained by turning the film strip of 14A over.
Figure 14C:
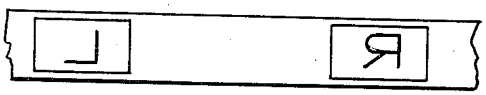
Fig. 14C is a view showing how a transparent untransposed pair of images appear if positioned in a stereoscope with the right image on the right side and the left image on the left side.

The system of the invention may also be employed for viewing films taken by stereocameras now available. These cameras take spaced stereoscopic pictures as shown in Fig. 14A. In taking the picture the image is inverted vertically to produce the images shown in Fig. 14A. The film 188 will contain other right or left images of other pictures between the frames 189 and 190 the amount of separation being somewhat close to the normal pupillary distance in humans but depending on the separation of the two lens of the camera. If one turns the film of Fig. 14A so that the images are seen vertically and normal and looks through the back side thereof the images will appear as in Fig. 14B. In Fig. 14B it will be noted that the images are righted but the right image is in front of the left eye and the left image is in front of the right eye. If the film is turned around seen from the front side it appears as shown in Fig. 14C. Here the right and left images are on their right and left sides but are laterally reversed. If these two images are viewed (without reversing their position) through a stereoptic viewer of the type now available a pseudoscopic picture will be obtained by the fusion process of the viewers optical system, i. e., the portions of the view which should appear in relief will appear as intaglio and vice versa. This illustrates why it has always been necessary, heretofore, to cut the stereopictures from the film and mount them in reversed position.

Figure 15:
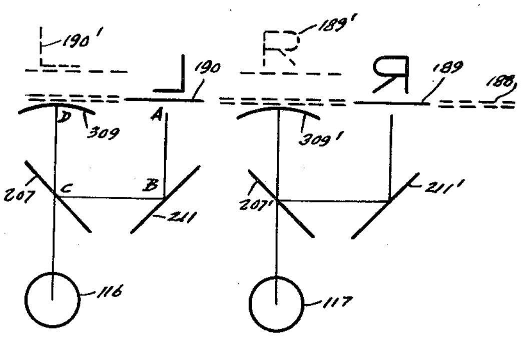
Fig. 15 is a view similar to Fig. 10 of an optic system for viewing the film strip of Figs. 14A–14B–14C stereoscopically without cutting the strip and reversing the two stereoscopic pictures.

Fig. 15 shows how this invention avoids the necessity of cutting and remounting the stereopictures of Figs. 14A, 14B and 14C. The viewer of Fig. 15 is formed with two identical units each designed to provide three reflections of the image and thereby produce a lateral reversal of the image. Fig. 15 is, in fact, derived from Fig. 12 by taking half of the viewer disclosed therein and duplicating that half exactly. Thus the eye 116 will see virtual image 190' and eye 117 will see virtual image 189'.

In the same way the other half of the system of Fig. 12 could be duplicated to produce a similar viewer or any half of the systems shown in Figs. 10, 11 or 13 could be likewise duplicated to produce such a viewer.

It was stated above that the amount of separation of frames 189 and 190 in Fig. 14A depends on the lens of the camera but is close to the pupillary distance in humans. Of such cameras investigated the distance of separation has been found to vary between 63 and 80 mm. Some people prefer a camera having a P. D. of 80 mm. because this larger P. D. gives a hyperstereo or exaggerated stereo effect. Since the films are eventually cut up and remounted to suit the P. D. of the viewing instrument it is of no importance that this distance is larger than the normal P. D. In applicant's device this difference can also be compensated for by making both of the diagonal mirrors movable with respect to its complementary diagonal mirror. In Fig. 15 for example moving the mirror 211 and 211' along line CB will change the P. D. of the portion of film 188 which is focused without changing the inter-axial distance of mirrors 309 and 309'.

The features and principles underlying the invention described above in connection with specific exemplifications will suggest to those skilled in the art many other modifications thereof. It is accordingly desired that the appended claims shall not be limited to any specific features or details shown and described in connection with the exemplifications thereof.

I claim:

1. A magnifying reflecting binocular viewer for viewing a pair of stereoscopic pictures comprising in combination, a housing, means within said housing for positioning two stereoscopic pictures along one plane in said housing, matched magnifying and reflecting optical systems in said housing, one system for each of two stereoscopic pictures positioned by said positioning means, each of said magnifying and reflecting optical systems comprising a spherical mirror, a semi-transparent mirror and an opaque planar mirror, said semi-transparent mirror extending across the field of one of a pair of stereoscopic pictures held in said positioning means and being at an angle of approximately 45° with respect to the plane defined by said positioning means and also with respect to the axis of said spherical mirror, said planar opaque mirror being positioned in said housing at an angle of approximately 90° with respect to said semi-transparent mirror and spaced from the field of said stereoscopic picture whereby said opaque planar mirror receives light from a stereoscopic picture only after the direction of said light has been changed by said semi-transparent mirror, and whereby the light passing through the two matched optical systems from each of said two stereoscopic pictures held in said positioning means passes through said semi-transparent mirror once in the direction of the axis of said spherical mirror and is reflected once by a semi-transparent mirror, once by a spherical mirror and once by an opaque planar mirror to reverse the images of said pictures in one direction.

2. The device as set forth in claim 1 in which the two matched magnifying and reflecting systems are symmetrically opposed to each other whereby the images of two juxtapositioned stereoscopic pictures are separated, the pair of opaque planar mirrors being spaced a distance substantially equal to the normal pupillary distance.

3. The device as set forth in claim 1 in which the two matched magnifying and reflecting systems are identical whereby the images of two spaced stereoscopic pictures held in said positioning means are obtained in reversed position but in substantially the same spaced relationship as in the two original stereoscopic pictures.

References Cited in the file of this patent

UNITED STATES PATENTS

| | | |
|---|---|---|
| 2,581,000 | Copeland | Jan. 1, 1952 |
| 2,619,872 | Shepard | Dec. 5, 1952 |

FOREIGN PATENTS

| | | |
|---|---|---|
| 400,182 | France | May 24, 1909 |
| 624,129 | Germany | Dec. 31, 1932 |